United States Patent
Minster (10) Patent No.: US 10,163,017 B2
(45) Date of Patent: Dec. 25, 2018

(54) SYSTEMS AND METHODS FOR VEHICLE SIGNAL LIGHT DETECTION

(71) Applicant: GM GLOBAL TECHNOLOGY OPERATIONS LLC, Detroit, MI (US)

(72) Inventor: Gautier Minster, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/693,956

(22) Filed: Sep. 1, 2017

(65) Prior Publication Data

US 2017/0364758 A1 Dec. 21, 2017

(51) Int. Cl.
| | | |
|---|---|---|
| G06K 9/00 | (2006.01) |
| G01S 17/02 | (2006.01) |
| G01S 17/06 | (2006.01) |
| G01S 17/66 | (2006.01) |
| G01S 17/89 | (2006.01) |
| G06K 9/62 | (2006.01) |
| G06T 7/73 | (2017.01) |
| G06T 7/246 | (2017.01) |
| G06K 9/20 | (2006.01) |
| G05D 1/02 | (2006.01) |
| G08G 1/16 | (2006.01) |

(52) U.S. Cl.
CPC ........ *G06K 9/00825* (2013.01); *G01S 17/023* (2013.01); *G01S 17/026* (2013.01); *G01S 17/06* (2013.01); *G01S 17/66* (2013.01); *G01S 17/89* (2013.01); *G06K 9/00798* (2013.01); *G06K 9/2054* (2013.01); *G06K 9/623* (2013.01); *G06K 9/6288* (2013.01); *G06T 7/246* (2017.01); *G06T 7/73* (2017.01); *G05D 1/0248* (2013.01); *G05D 2201/0213* (2013.01); *G06T 2207/10028* (2013.01); *G06T 2207/30256* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 9,383,753 | B1* | 7/2016 | Templeton | G05D 1/0246 |
| 9,508,260 | B2* | 11/2016 | Shaik | G08G 1/14 |
| 9,812,008 | B2* | 11/2017 | Tong | G08G 1/167 |
| 9,940,834 | B1* | 4/2018 | Konrardy | G08G 1/096725 |
| 9,944,317 | B2* | 4/2018 | Lee | B62D 15/0265 |
| 10,019,008 | B2* | 7/2018 | Kong | G05D 1/0214 |
| 10,025,319 | B2* | 7/2018 | Liu | G05D 1/0055 |
| 10,032,085 | B2* | 7/2018 | Raghu | G06K 9/00818 |

(Continued)

*Primary Examiner* — Ishrat I Sherali
(74) *Attorney, Agent, or Firm* — Lorenz & Kopf, LLP (57) ABSTRACT

Systems and methods are provided for analyzing vehicle signal lights in order to operate an autonomous vehicle. A method includes receiving an image from a camera regarding a vehicle proximate to the autonomous vehicle. Data from a lidar sensor regarding the proximate vehicle is used to determine object information for identifying a subsection within the camera image. The identified subsection corresponds to an area of the proximate vehicle containing one or more vehicle signals. One or more vehicle signal lights of the proximate vehicle is located by using the identified camera image subsection as an area of focus.

20 Claims, 8 Drawing Sheets

(56) References Cited

U.S. PATENT DOCUMENTS

| | | | | |
|---|---|---|---|---|
| 2015/0088373 | A1* | 3/2015 | Wilkins | G05D 1/0234 |
| | | | | 701/36 |
| 2016/0311431 | A1* | 10/2016 | Kato | B62D 1/28 |
| 2016/0349354 | A1* | 12/2016 | Yomo | G01S 7/36 |
| 2017/0057520 | A1* | 3/2017 | Letwin | B60W 50/082 |
| 2017/0316684 | A1* | 11/2017 | Jammoussi | G06T 11/60 |

* cited by examiner

SYSTEMS AND METHODS FOR VEHICLE SIGNAL LIGHT DETECTION

TECHNICAL FIELD

The present disclosure generally relates to autonomous vehicles, and more particularly relates to systems and methods for vehicle signal light detection in an autonomous vehicle.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Some autonomous vehicles can include systems that detect signal lights of vehicles within the driving environment. In these systems, an entire image obtained from a camera is typically searched for vehicle signals that need to be detected. This approach to vehicle signal detection is computationally intensive and expensive, which makes it slow and very time consuming.

Accordingly, it is desirable to provide systems and methods that can speed up the process of vehicle signal detection. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for analyzing vehicle signal lights in order to operate an autonomous vehicle. In one embodiment, a system and method includes receiving, by one or more data processors, an image from a camera regarding a vehicle proximate to the autonomous vehicle. Data from a lidar sensor regarding the proximate vehicle is used to determine object information for identifying a subsection within the camera image. The identified subsection corresponds to an area of the proximate vehicle containing one or more vehicle signals. One or more vehicle signal lights of the proximate vehicle is located by using the identified camera image subsection as an area of focus.

In other embodiments, a system and method includes receiving, by one or more data processors, an image from a camera regarding a vehicle proximate to the autonomous vehicle. Data from a lidar sensor regarding the proximate vehicle is used, by the one or more processors, to determine object geometry and position information for identifying a subsection within the camera image. The identified subsection corresponds to an area of the proximate vehicle containing one or more vehicle signals. One or more vehicle signal lights of the proximate vehicle is located, by the one or more processors, by using the identified camera image subsection as an area of focus. Tracking of the proximate vehicle is based upon the located one or more vehicle signal lights of the proximate vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
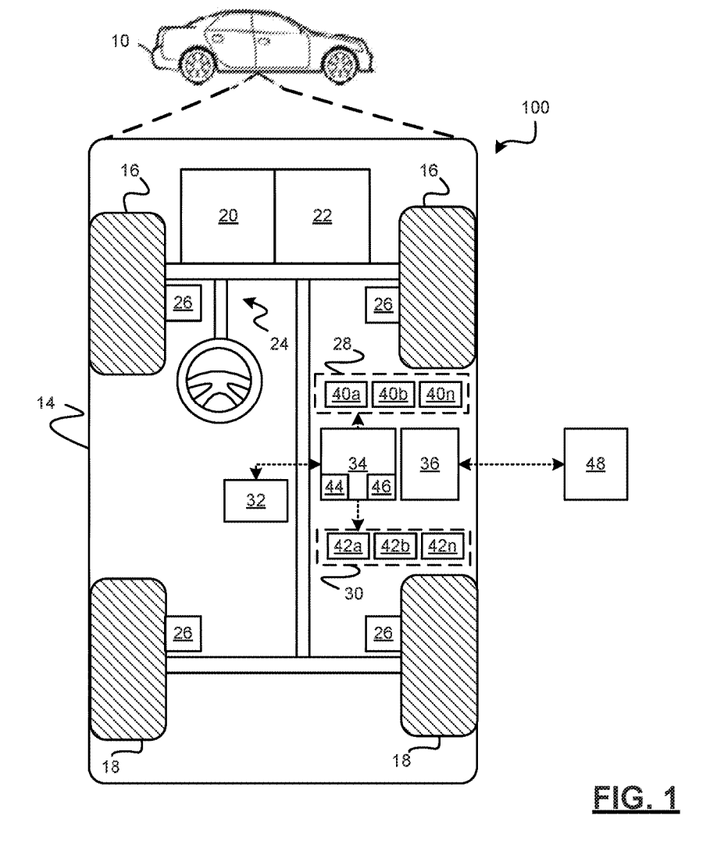
FIG. 1 is a functional block diagram illustrating an autonomous vehicle, in accordance with various embodiments.

With reference to FIG. 1, a system for performing an autonomous vehicle control shown generally as 100 is associated with a vehicle 10 in accordance with various embodiments. In general, the system 100 provides for low level processing of three-dimensional images of surroundings of the vehicle 10, in the form of point clouds, to determine velocity of surrounding objects for use in controlling the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores processing algorithms and data for processing three-dimensional point clouds to determine velocity of objects in the surroundings on a frame by frame basis. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in processing three-dimensional imaging data of surroundings of the vehicle 10 in the form of point clouds to determine velocity on a frame by frame basis for use in autonomous control of the vehicle.

Figure 2:
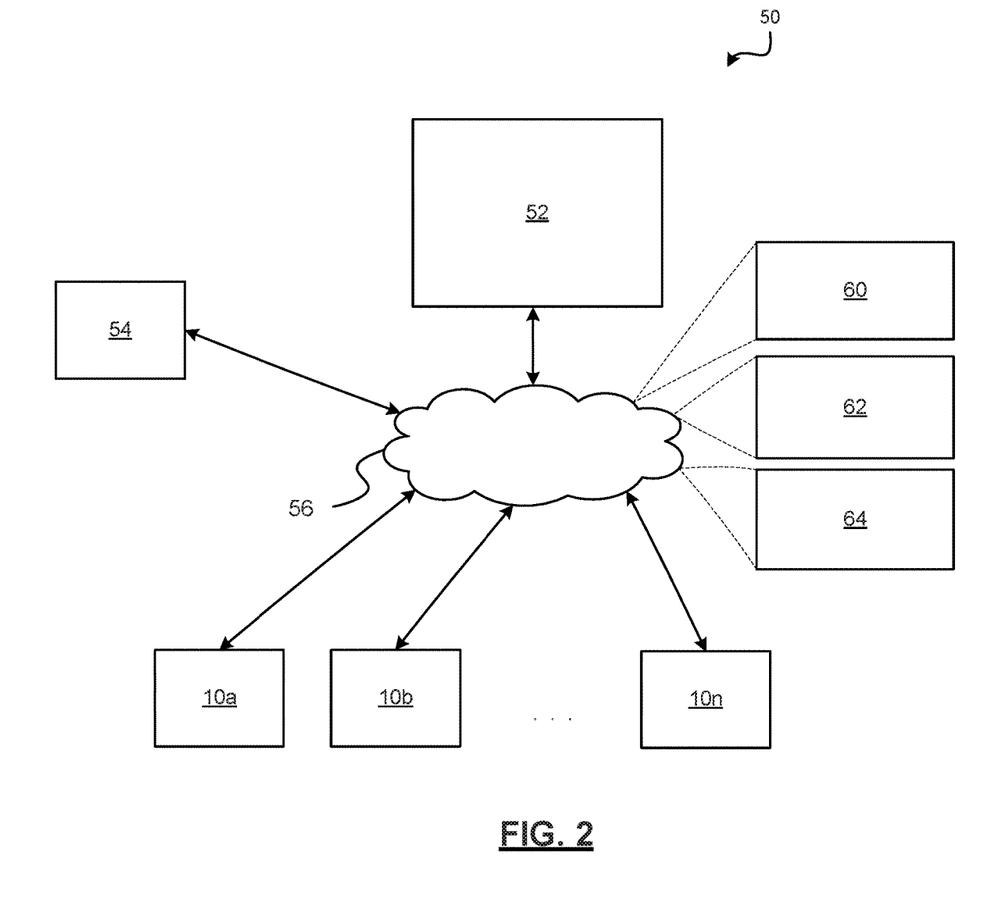
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including lane markings for roadways along the various routes, and whether and to what extent particular route segments are impacted by construction zones or other possible hazards or impediments that have been detected by one or more of autonomous vehicles 10a-10n.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
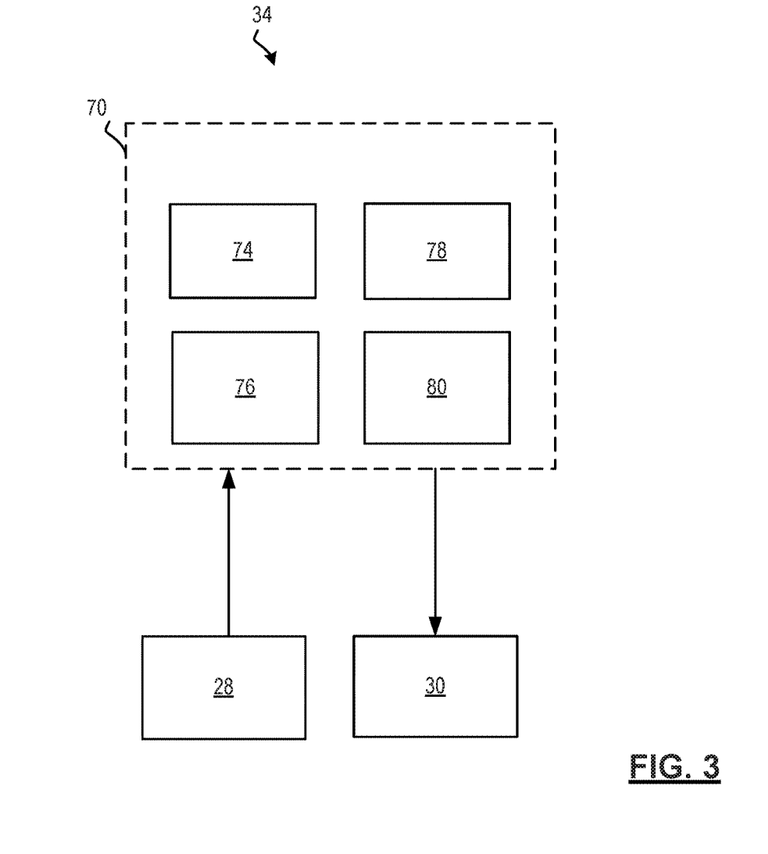
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
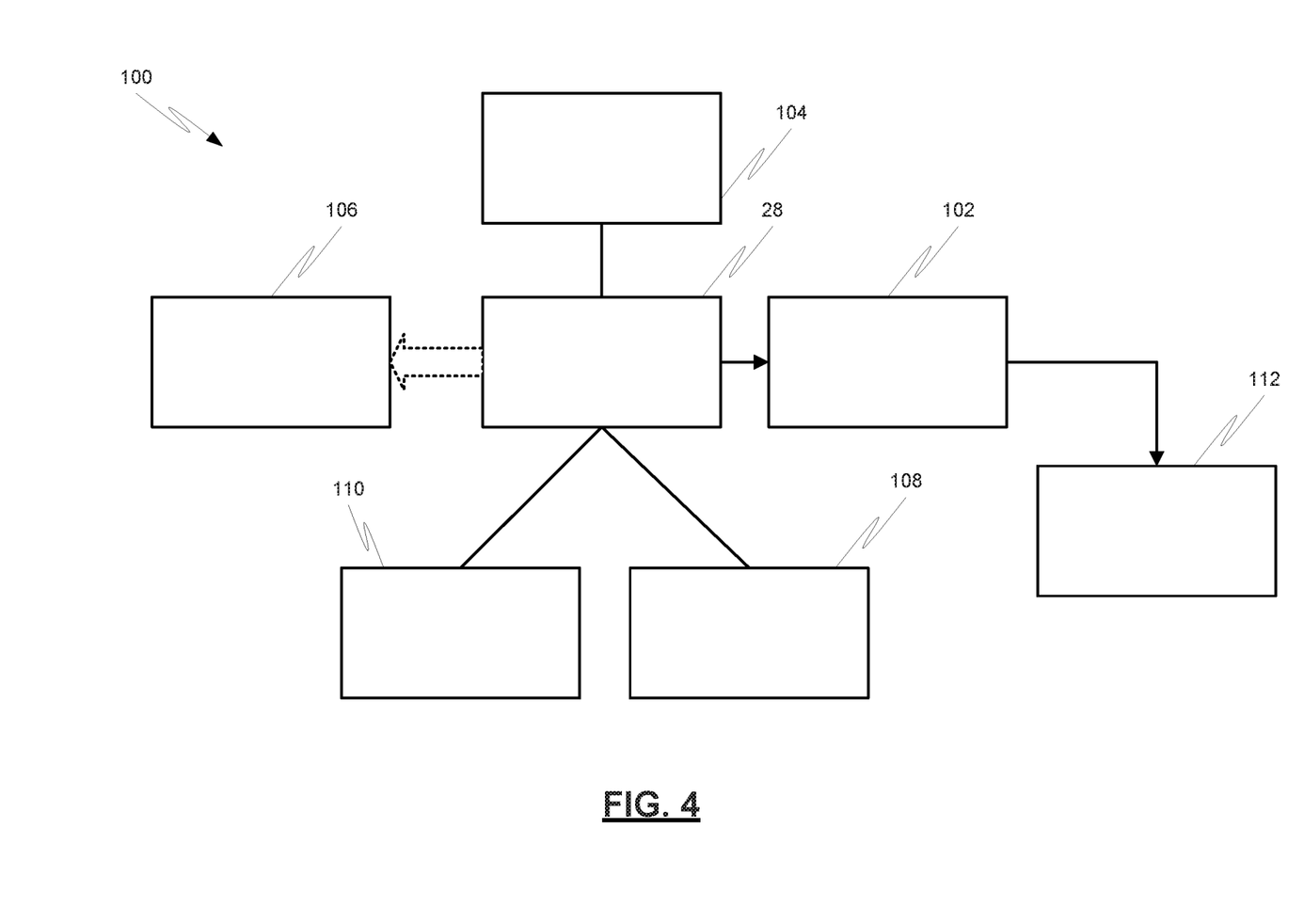
FIGS. 4 and 5 are functional block diagrams depicting a vehicle signal processing system, in accordance with various embodiments.

For example, as shown at 100 in more detail with regard to FIG. 4 and with continued reference to FIG. 3, system 102 uses the sensor system 28 of an autonomous vehicle 104 to detect signals of other vehicles 106. The system 102 can also analyze characteristics of the detected signals, such as whether the signals are brake lights, turn signals, etc.

The system 102 uses lidar 108 to obtain fine details of object geometry and position in images from camera(s) 110. With this information, the system 102 knows where the back, sides, and top of the car are. This provides a more efficient and less computationally intensive approach to finding the taillights and filtering out false positives more easily. The output of system 102 can be used for the autonomous vehicle 104 for many purposes including autonomous vehicle tracking control operations 112. As an illustration, the system 102 can determine signal state such as whether the other vehicles are braking, have hazards on, have turn signals on, etc. This signal behavior improves tracking of the other vehicles that are in proximity to the autonomous vehicle 104.

Figure 5:
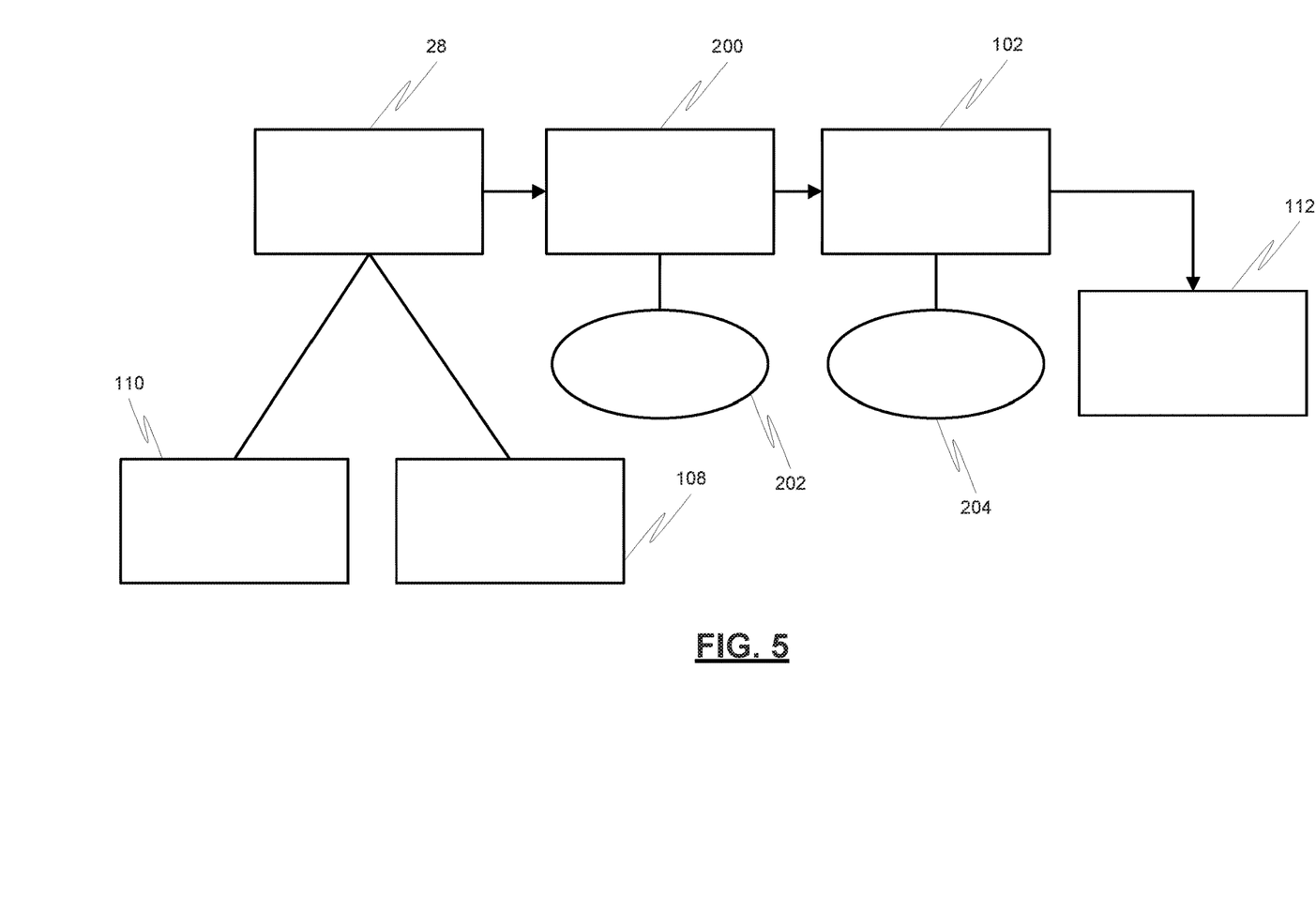

FIG. 5 depicts a tracking system 200 assisting the system 102 with the detection analysis of the other vehicles' signals. Tracking by system 200 results in identification of where other vehicles should be relative to the autonomous vehicle. Tracking information can include object data, such as geometry and position information 202 of the other vehicles relative to the autonomous vehicle.

System 102 uses the tracking information to analyze regions within a camera image for vehicle light sources. The analysis produces vehicle image subsections 204 of the camera image that the system 102 can further process to detect vehicle signal lights. Such further processing can include delineating light sources within the image frame to narrow regions for analysis.

The system 102 uses a combination of sensors within the sensor system 28 to obtain information for vehicle signal detection and analysis. Many different types of sensor configurations can be used as shown, for example, in FIG. 6.

Figure 6:
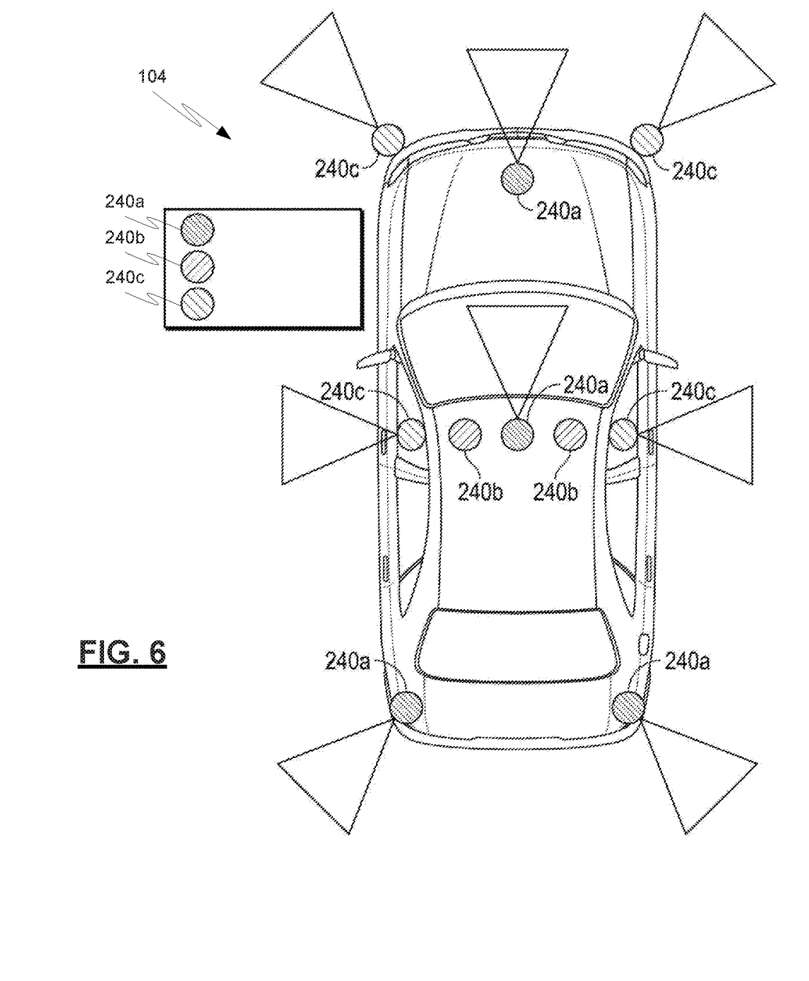
FIG. 6 depicts an exemplary vehicle that includes a plurality of radar devices, cameras, and lidar devices that are distributed about the vehicle in accordance with various embodiments of the present disclosure.

FIG. 6 depicts an exemplary autonomous vehicle 104 that includes a plurality of radar devices 240a distributed about the vehicle 104, a plurality of cameras 240b distributed about the vehicle 104 and a plurality of lidar devices 240c distributed about the vehicle 104.

The radar devices 240a are disposed at different locations of the vehicle 104, and in one embodiment, are disposed symmetrically about the longitudinal axis of the vehicle 104 to achieve parallax. Each of the radar devices 240a may include or incorporate components suitably configured to horizontally and rotatably scan the environment to generate radar data that is consumed by other systems.

The cameras 240b are also disposed at different locations and oriented to provide different field of views that capture different portions of the surrounding environment in the vicinity of the vehicle 104. For example, a first camera 240b is positioned at the front left (or driver) side of the vehicle 104 and has its field of view oriented 45° counterclockwise relative to the longitudinal axis of the vehicle 104 in the forward direction, and another camera 240b may be positioned at the front right (or passenger) side of the vehicle 104 and has its field of view oriented 45° clockwise relative to the longitudinal axis of the vehicle 104. Additional cameras 240b are positioned at the rear left and right sides of the vehicle 104 and similarly oriented away from the longitudinal axis at 45° relative to the vehicle longitudinal axis, along with cameras 240b positioned on the left and right sides of the vehicle 104 and oriented away from the longitudinal axis perpendicular to the vehicle longitudinal axis. The illustrated embodiment also includes a pair of cameras 240b positioned at or near the vehicle longitudinal axis and oriented to capture a forward looking field of view along a line of sight substantially parallel to the vehicle longitudinal axis.

In exemplary embodiments, the cameras 240b have angle of views, focal lengths, and other attributes that are different from those of one or more other cameras 240b. For example, the cameras 240b on the right and left sides of the vehicle may have an angle of view that is greater than the angle of view associated with the cameras 240b positioned at the front left, front right, rear left, or rear right of the vehicle. In some embodiments, the angle of view of the cameras 240b are chosen so that the field of view of different cameras 240b overlap, at least in part, to ensure camera coverage at particular locations or orientations relative to the vehicle 104.

The lidar devices 240c are also disposed at different locations of the vehicle 104, and in one embodiment, are disposed symmetrically about the longitudinal axis of the vehicle 104 to achieve parallax. Each of the lidar devices 240c may include or incorporate one or more lasers, scanning components, optical arrangements, photodetectors, and other components suitably configured to horizontally and rotatably scan the environment in the vicinity of the vehicle 104 with a particular angular frequency or rotational velocity. For example, in one embodiment, each lidar device 240c is configured to horizontally rotate and scan 360° at a frequency of 10 Hertz (Hz). As used herein, a lidar scan should be understood as referring to a single revolution of a lidar device 240c.

In exemplary embodiments described herein, the frequency or rate at which the cameras 240b capture images is greater than the angular frequency of the lidar devices 240c. For example, in one embodiment, the cameras 240b capture new image data corresponding to their respective field of view at a rate of 30 Hz. Thus, each camera 240b may capture multiple images per lidar scan, and capture the images at different times independent of the orientation of the lidar device 240c or the angular position within the scan. Accordingly, the subject matter described herein selects or otherwise identifies an image from each respective camera 240b that is temporally associated with the lidar point cloud data from a particular lidar scan based on the timestamps of the images captured by that respective camera 240b relative to a sampling time at which the angular position of the lidar scan corresponds to the line of sight of a lidar device 240c being aligned substantially parallel to the bisector (or line of sight) of the angle of view of the respective camera 240b.

The tracking system of the autonomous vehicle uses the information from these different types of sensors to track the three-dimensional location and geometry of objects in the vicinity of the vehicle. In one exemplary embodiment, the tracking system can generate or use such tracking for as three-dimensional locations of objects, distance/depth of the object from the vehicle, dimensions and shapes of the objects, velocity of the objects, etc.

Figure 7:
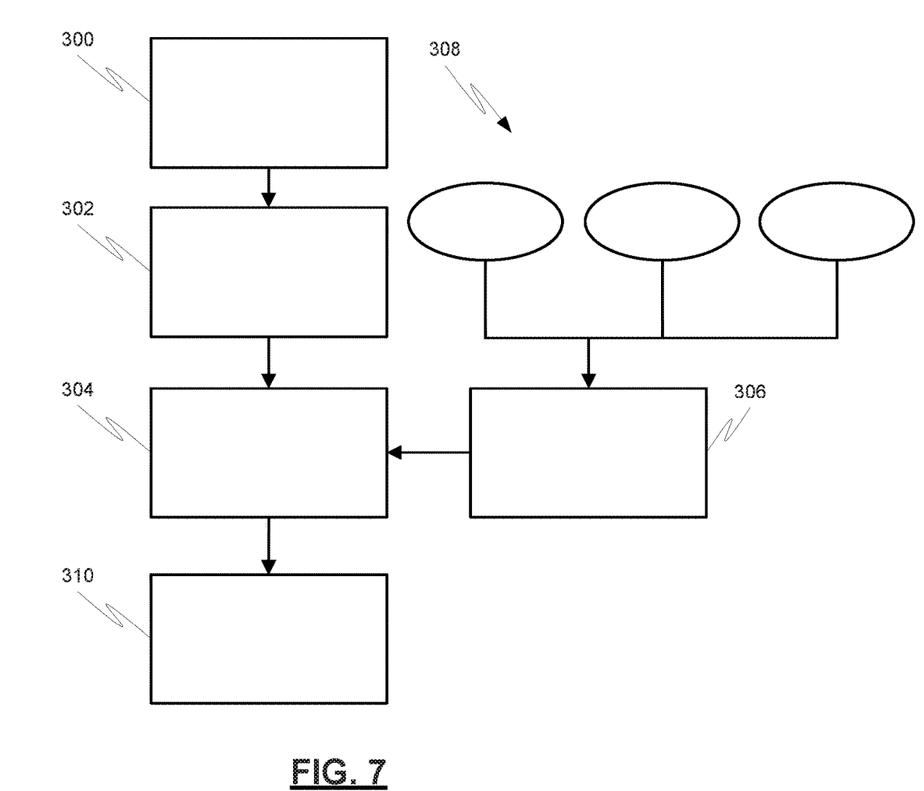
FIG. 7 is a flowchart depicting an operational scenario involving vehicle signal detection.

FIG. 7 illustrates an operational scenario where information from the tracking system is used for detecting and analyzing other vehicles' signal lights. Process block 300 obtains camera image and lidar information. This information is used by process block 302 for determining object data and other types of tracking information.

In this operational scenario, process block 304 uses the output of the tracking process to focus on specific spots within the image that have the highest probability of containing vehicle lights. Process block 304 identifies the highest probability locations within the image by knowing the sizes of lights the system is expecting to see within the image.

Additional analysis can further refine the focus area within the image. Process block 306 obtains additional vehicle environmental information 308 to facilitate the focused analysis. The additional information 308 from this process can include lane information, vehicle velocity, etc. For example, lane information can determine vehicle orientation (e.g., whether a proximate car is facing away or towards the autonomous vehicle). This in turn provides a filter for determining which lights of the other proximate vehicles are actually vehicle rear lights (versus a vehicle's headlights) as well as resolving false positives such as images on truck or reflections in surfaces. In this operational scenario, it is noted that proximate indicates that the other vehicle is within the driving environment of the autonomous vehicle and is in front of the autonomous vehicle, to the side, or at another orientation where vehicle signals are entirely or partially visible to the autonomous vehicle. The additional information 308 can be obtained such as from vehicle localization operations. Vehicle localization operations can include estimating position and orientation of the vehicle in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle). Localization can also incorporate new data collected as a result of expanded map areas obtained via onboard mapping functions performed by the vehicle during operation and mapping data "pushed" to the vehicle via the wireless carrier system 60.

The focused areas within the camera images allow for easier and more efficient identification of signal lights and process block 310. The focused area(s) within the camera images allow for easier and more efficient identification of signal lights by process block 310. Process block 310 can perform identification of the vehicle signal lights within the focused areas in many different ways. For example, a neural network, such as a convolutional neural network, can be trained to identify the state of the vehicle signal lights. The convolutional neural network, can be trained to perform the identification based upon the colors appearing within the focused areas as well as such other factors as position of the objects (e.g., "blobs") of color within the focused areas as well as distinguish between circles and arrows associated with the signal lights.

Additionally, the neural network can assess symmetry of the objects of color. For example, the neural network can be trained to detect that vehicle brake lights have been activated based upon red colors appearing at the left side and right side of the vehicle along a horizontal plane. Other positional information can be used, such as assessing whether a red brake light is also activated within the rear window of the vehicle.

The increase in efficiency is realized, among other reasons, by the processing overcoming the difficulty of performing vehicle signal detection by merely looking for a light within the image as this can lead to many responses. The processing in FIG. 7 overcomes this by avoiding the analysis of non-relevant portions of the image, thereby resulting in a reduction of image processing cycles.

Figure 8:
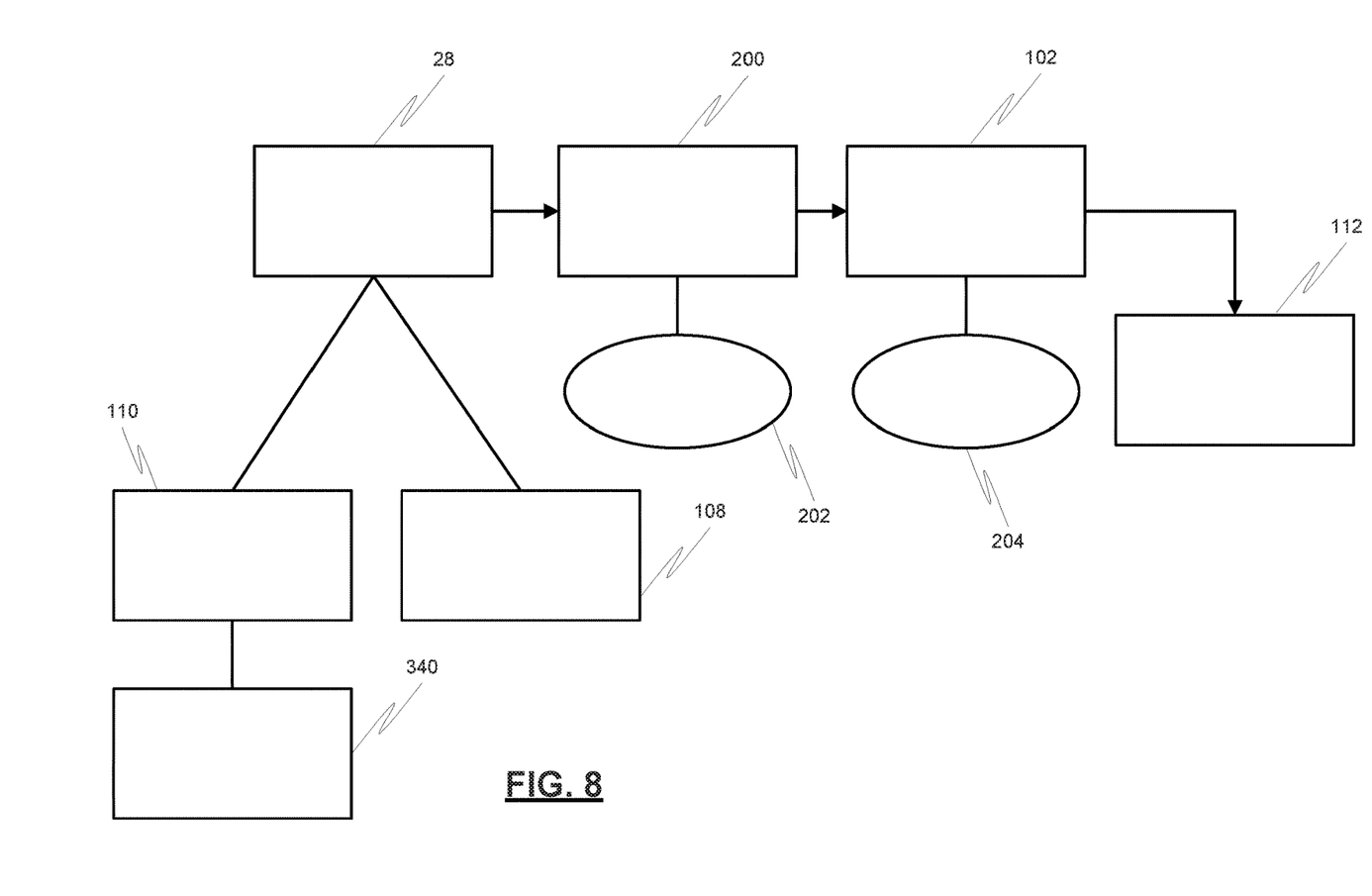
FIG. 8 is a functional block diagram depicting a vehicle signal processing system using fixed exposure cameras, in accordance with various embodiments.

FIG. 8 depicts the use of fixed exposure cameras 340 on the autonomous vehicle for vehicle signal detection and analysis. An example of a fixed exposure camera includes the aperture of the camera's lens being fixed as well as the sensor exposure time and sensor gain being fixed. In this way, the intensity of light sources is the same and becomes more stable. This allows a more effective use of thresholds on brightness. More specifically, because a fixed exposure camera allows lights to appear with the same intensity, a fixed exposure camera allows light sources to be delineated within the image frame to narrow regions for analysis by the vehicle signal detection and analysis system 102.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for analyzing vehicle signal lights in order to operate an autonomous vehicle, comprising:
   receiving, by one or more processors, an image from a camera regarding a vehicle proximate to the autonomous vehicle;
   using, by the one or more processors, data from a lidar sensor regarding the proximate vehicle to determine object geometry and position information for identifying a subsection within the camera image, wherein the identified subsection corresponds to an area of the proximate vehicle containing one or more vehicle signals; and
   locating, by the one or more processors, one or more vehicle signal lights of the proximate vehicle by using the identified camera image subsection as an area of focus;
   wherein tracking of the proximate vehicle is based upon the located one or more vehicle signal lights of the proximate vehicle.

2. The method of claim 1, wherein the data from the lidar sensor provides object depth and distance information;
   wherein the lidar sensor and camera are calibrated so that depth can be assigned to the camera image.

3. The method of claim 1, wherein behavior of the proximate vehicle is predicted based upon the located proximate vehicle signal lights.

4. The method of claim 1, wherein the locating of the one or more vehicle signal lights by using the identified camera image subsection results in filtering out false positives.

5. The method of claim 1, wherein the locating of the one or more vehicle signal lights includes using lane information and velocity of the proximate vehicle to differentiate between front of the proximate vehicle and back of the proximate vehicle.

6. The method of claim 1, wherein the camera image is from a fixed exposure camera.

7. The method of claim 1, wherein the one or more vehicle signal lights include turn signals, hazard lights, and brake lights.

8. The method of claim 1, wherein the identifying of the subsection of the camera image includes determining whether the camera image includes rear of the proximate vehicle or front of the proximate vehicle, wherein the identifying of the subsection of the camera image is based upon sizes of signal lights expected to be located within the camera image.

9. The method of claim 1, wherein the identifying of the subsection of the camera image eliminates other lights that are not vehicle signal lights, thereby reducing processing cycles by avoiding analysis of non-relevant portions of the camera image.

10. The method of claim 1, wherein the proximate vehicle is in front of the autonomous vehicle or to the side of the autonomous vehicle.

11. A system for analyzing vehicle signal lights in order to operate an autonomous vehicle, the system comprising:
    a storage device for storing instructions for performing safety analysis of autonomous vehicle operation; and one or more data processors configured to execute the instructions to:
receive an image from a camera regarding a vehicle proximate to the autonomous vehicle;
use data from a lidar sensor regarding the proximate vehicle to determine object geometry and position information for identifying a subsection within the camera image, wherein the identified subsection corresponds to an area of the proximate vehicle containing one or more vehicle signals; and
locate one or more vehicle signal lights of the proximate vehicle by using the identified camera image subsection as an area of focus;
wherein tracking of the proximate vehicle is based upon the located one or more vehicle signal lights of the proximate vehicle.

12. The system of claim 11, wherein the data from the lidar sensor provides object depth and distance information; wherein the lidar sensor and camera are calibrated so that depth can be assigned to the camera image.

13. The system of claim 11, wherein behavior of the proximate vehicle is predicted based upon the located proximate vehicle signal lights.

14. The system of claim 11, wherein the locating of the one or more vehicle signal lights by using the identified camera image subsection results in filtering out false positives.

15. The system of claim 11, wherein the locating of the one or more vehicle signal lights includes using lane information and velocity of the proximate vehicle to differentiate between front of the proximate vehicle and back of the proximate vehicle.

16. The system of claim 11, wherein the camera image is from a fixed exposure camera.

17. The system of claim 11, wherein the one or more vehicle signal lights include turn signals, hazard lights, and brake lights.

18. The system of claim 11, wherein the identifying of the subsection of the camera image includes determining whether the camera image includes rear of the proximate vehicle or front of the proximate vehicle, wherein the identifying of the subsection of the camera image is based upon sizes of signal lights expected to be located within the camera image.

19. The system of claim 11, wherein the identifying of the subsection of the camera image eliminates other lights that are not vehicle signal lights, thereby reducing processing cycles by avoiding analysis of non-relevant portions of the camera image, wherein the proximate vehicle is in front of the autonomous vehicle or to the side of the autonomous vehicle.

20. An autonomous vehicle comprising:
at least a camera and lidar sensor that provides sensor data; and
a controller that, by a processor and based on the sensor data:
receives an image from the camera regarding a vehicle proximate to the autonomous vehicle;
uses data from the lidar sensor regarding the proximate vehicle to determine object geometry and position information for identifying a subsection within the camera image, wherein the identified subsection corresponds to an area of the proximate vehicle containing one or more vehicle signals; and
locates one or more vehicle signal lights of the proximate vehicle by using the identified camera image subsection as an area of focus;
wherein tracking of the proximate vehicle is based upon the located one or more vehicle signal lights of the proximate vehicle.

* * * * *